United States Patent
Kidambi et al.

(10) Patent No.: US 12,445,038 B2
(45) Date of Patent: Oct. 14, 2025

(54) TURN ON DELAY MEASUREMENTS FOR CAPACITIVE LOAD

(71) Applicant: TEXAS INSTRUMENTS INCORPORATED, Dallas, TX (US)

(72) Inventors: Vasishta Kidambi, Hyderabad (IN); Harsh Patel, Mumbai (IN); Aalok Dyuti Saha, Bangalore (IN); Subrato Roy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 427 days.

(21) Appl. No.: 17/891,456

(22) Filed: Aug. 19, 2022

(65) Prior Publication Data

US 2023/0072953 A1 Mar. 9, 2023
US 2024/0283350 A9 Aug. 22, 2024

(30) Foreign Application Priority Data

Aug. 23, 2021 (IN) .............................. 202141038083

(51) Int. Cl.
*G01R 31/28* (2006.01)
*H02M 1/08* (2006.01)

(52) U.S. Cl.
CPC .......... *H02M 1/08* (2013.01); *G01R 31/2882* (2013.01)

(58) Field of Classification Search
CPC ............................. H02M 1/08; G01R 31/2882
See application file for complete search history.

(56) References Cited

U.S. PATENT DOCUMENTS

| | | |
|---|---|---|
| 7,949,916 B1 | 5/2011 | Ang |
| 8,531,196 B1 | 9/2013 | Shelat et al. |
| 9,425,785 B1* | 8/2016 | Wibben ................ H03K 17/165 |
| 2006/0072349 A1 | 4/2006 | Lin |
| 2006/0220677 A1* | 10/2006 | Hazucha .......... G01R 31/31726 |
| | | 326/38 |
| 2015/0293825 A1 | 10/2015 | Kim |

OTHER PUBLICATIONS

Texas Instruments; "LM74722-Q1 Automotive Low IQ Ideal Diode Controller with 200-kHz Active Rectification and Load Dump Protection"; Article; Sep. 2021—Revised Feb. 2022; 31 pgs.
PCT Search Report PCT/US2022/041159 mailed Dec. 6, 2022, 3 pages.

* cited by examiner

*Primary Examiner* — Feba Pothen
(74) *Attorney, Agent, or Firm* — Ronald O. Neerings; Frank D. Cimino (57) ABSTRACT

One example includes a testing method that includes connecting a capacitor having a first capacitance to an output terminal of an integrated circuit (IC). The method can also include generating pulse signal responsive to an enable signal provided at at least one input terminal of the IC and providing a drive signal to the output terminal to cause a linearly increasing voltage across the capacitor responsive to the pulse signal. The method can also include measuring a no-load delay. The method can also include measuring the linearly increasing voltage at the output terminal responsive to the drive signal. The method can also include determining a first capacitance charge time for the capacitor responsive to the linearly increasing voltage reaching a threshold and determining a second capacitance charge delay for a second capacitance based on the first capacitance charge time and the no-load delay.

26 Claims, 7 Drawing Sheets

TURN ON DELAY MEASUREMENTS FOR CAPACITIVE LOAD

CROSS-REFERENCE TO RELATED APPLICATION

This application claims priority to Indian provisional application no 202114038083, filed Aug. 23, 2021.

TECHNICAL FIELD

This description relates generally to circuits, systems and methods for measuring turn on delay for capacitive loads.

BACKGROUND

It is common practice for manufacturers to use testing systems to ensure reliability and operating parameters of integrated circuit (IC) devices, including for semiconductor dies, packaged IC's or systems on chip (SOCs). The results of such testing can determine operating specifications for the IC devices, such as are published for consumers of the IC devices. Consequently, the capability of a given testing system can be a limiting factor for ratings and/or operating characteristics that can be specified in a data sheet for a given IC device.

SUMMARY

One example described herein includes a testing method that includes connecting a capacitor having a first capacitance to an output terminal of an integrated circuit (IC). The method can also include generating pulse signal responsive to an enable signal provided at at least one input terminal of the IC. The method can also include measuring a no-load delay representative of a time difference between a start of the enable signal and a start of the pulse signal. The method can also include providing a drive signal to the output terminal to cause a linearly increasing voltage across the capacitor responsive to the pulse signal. The method can also include measuring the linearly increasing voltage at the output terminal responsive to the drive signal. The method can also include determining a first capacitance charge time for the capacitor responsive to the linearly increasing voltage reaching a threshold and determining a second capacitance charge delay for a second capacitance based on the first capacitance charge time and the no-load delay.

Another example described herein includes a test system. The test system includes a test apparatus and an integrated circuit (IC). The IC, which has an input terminal and an output terminal includes a pulse generator and a linear driver. The pulse generator has a control input and a pulse output, and the control input is coupled to the input terminal. The pulse generator is configured to provide a pulse signal at the pulse output responsive to a forward event signal at the input terminal. The linear driver has a driver output, and is configured to provide a drive signal at the driver output responsive to the pulse signal. The IC is also configured to couple the driver output to the output terminal responsive to the pulse signal. A capacitor is coupled to the output terminal of the IC, and a linearly increasing voltage to be provided at the output terminal responsive to the drive signal. The test apparatus has a stimulus output and a measurement input, in which the stimulus output coupled to the input terminal and the measurement input coupled to the output terminal. The test apparatus is configured to provide the forward event signal at the stimulus output and to measure the voltage at the output terminal.

Another example described herein relates to a circuit. The circuit includes a pulse generator having a control input and a pulse output. The pulse generator is configured to provide a pulse signal at the pulse output responsive to a forward event signal at the control input. A buffer is coupled between the pulse output and a test output terminal. A linear driver has a driver output, and the linear driver is configured to provide a drive signal at the driver output. A switch is coupled between the driver output and a drive output terminal. The switch is configured to couple the driver output to the drive output terminal responsive to the pulse signal. A capacitor is coupled to the drive output terminal, and a linearly increasing voltage to be provided at the drive output terminal responsive to the drive signal.

DETAILED DESCRIPTION

This description relates generally to systems, methods and circuits for testing charging delay (e.g., also referred to herein as a turn-on delay) of circuitry configured to drive a capacitive load. The capacitive load, which is to be driven by the circuitry, can be a parasitic capacitance (e.g., of a transistor or other circuit element) and/or a capacitance of an electronic component (e.g., a fixed or variable capacitor). The circuitry under test includes design for testing (DFT) circuitry configured to linearize the charging profile of a given capacitive test load (e.g., an external capacitor having a known capacitance). As a result, systems, methods and circuits disclosed can accurately derive a charging delay for any one or more different capacitive loads based on the charging delay measured for the given capacitive load.

As an example, the circuitry under test (e.g., an IC die or package) includes a pulse generator configured to provide a pulse signal (e.g., a monoshot pulse signal) at a pulse output responsive to a test enable signal, such as a forward event signal provided by a test apparatus. The circuitry can also include a buffer coupled between the pulse output and a test terminal to which a test apparatus is coupled. The test apparatus can be coupled to the test terminal to measure the buffered pulse signal that is generated during testing. The test apparatus can be implemented as automatic test equipment (e.g., a test fixture) configured to perform from wafer to system level testing.

The circuitry also includes a linear driver having a driver output. The liner driver is configured to provide a linear drive signal, such as a constant current signal, to the driver output. A switch can be configured to couple the driver output to an output terminal of the circuitry responsive to the pulse signal. A capacitive load (e.g., an external capacitor) can be coupled to the output terminal. During testing, the constant current charges the capacitive load to provide a linearly increasing capacitor voltage across the capacitive load at the output terminal. The linear driver thus is configured to provide the drive signal during testing to convert the charging profile of the capacitive load to a linear charging profile.

The test apparatus is also configured to measure a no-load time delay based on a difference between a start of the enable signal and a start of the pulse signal. The no-load time delay is representative of a control loop delay of the circuitry under test. The test apparatus also is configured to measure the linearly increasing voltage across the capacitive load responsive to the drive signal. The test apparatus is also configured to determine a first capacitance charge time responsive to the voltage across the capacitor terminal reaching a threshold. For example, the first capacitance charge time represents a time interval from the start of the enable signal to when the voltage across the capacitive load reaches the threshold. The threshold can be set as a test parameter to emulate a threshold voltage for turning on a transistor having a capacitance that approximates the capacitive load. The test apparatus is also configured to determine a second capacitance charge delay for a second capacitance value based on the first capacitance charge time and the no-load delay. The second capacitance can be different from the capacitance of the capacitive load that is coupled to the circuitry during test. For example, the second capacitance has value representative of a capacitance of another transistor expected to be driven by the circuitry.

Advantageously, the systems, circuits and methods described herein can derive the second capacitance charge delay for any second capacitance without requiring a load having the second capacitance actually being coupled to the circuitry. Thus, the same test apparatus can be re-used for various circuits, resulting in lower testing costs. As a result of implementing the DFT circuitry and performing testing, as described herein, manufacturers can provide customers an improved product specification (e.g., listing gate turn-on delay switching characteristics for multiple capacitive loads) without requiring testing for multiple capacitive loads.

Figure 1:
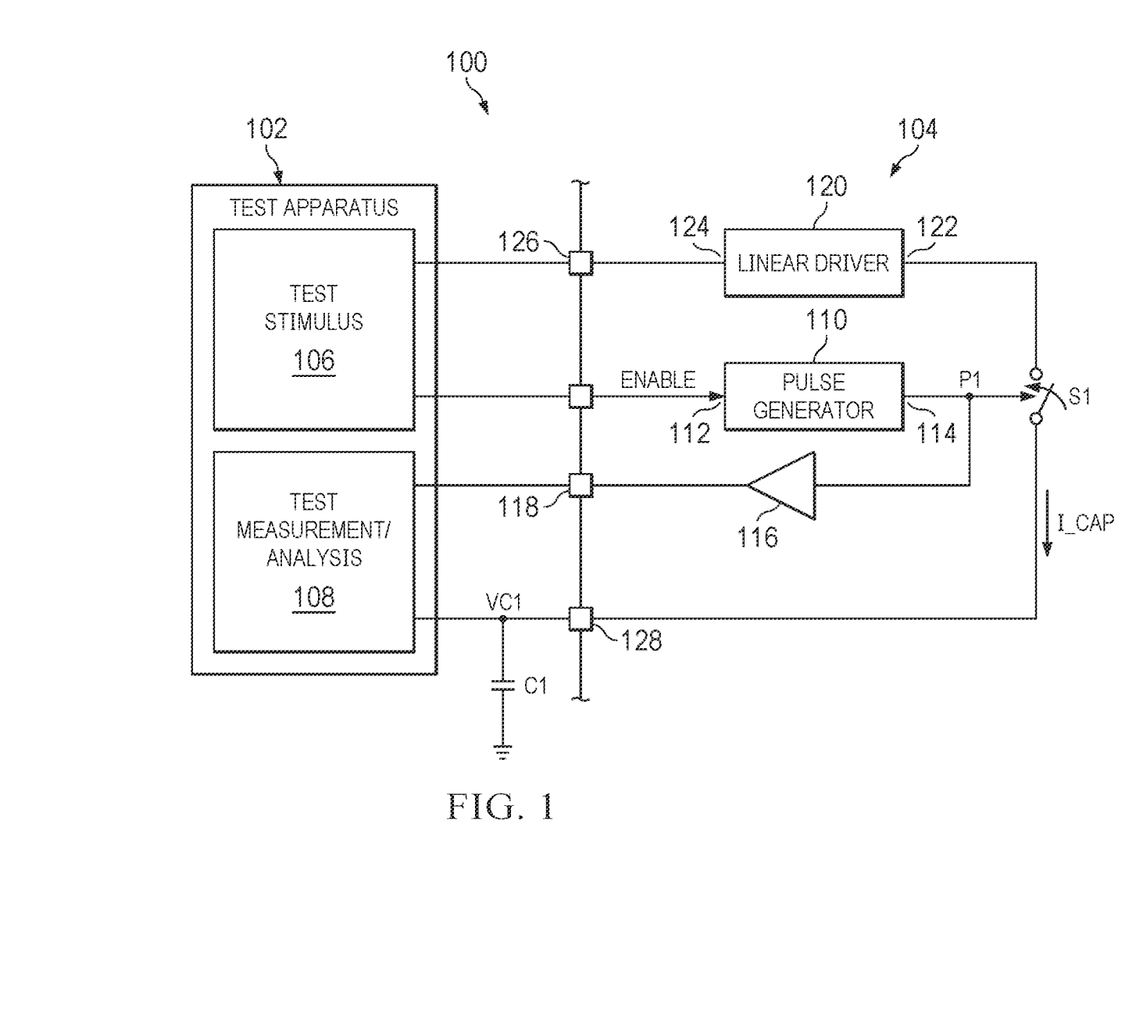
FIG. 1 depicts an example of a testing system including a test apparatus and an integrated circuit.

FIG. 1 depicts an example of a test system 100 including a test apparatus 102 and circuitry under test (also referred to herein as circuitry) 104. The circuitry 104 includes an arrangement of circuit components configured to drive an output coupled or adapted to be coupled to a capacitive load, shown as C1. For example, the circuitry under test 104 is implemented as an IC die (e.g., for wafer-level testing), a packaged IC device (e.g., an IC chip or a system on chip (SOC) for chip-level testing) or a circuit board (e.g., for board-level testing). In the example of FIG. 1, the test apparatus 102 includes an arrangement of inputs and outputs adapted to be coupled to respective terminals of the circuitry 104.

The test apparatus 102 can be implemented as a test platform, such as automatic test equipment, configured to test structural and/or function features of the circuitry 104. The test apparatus 102 can include a test stimulus circuit 106 configured to supply one or more voltages and test signals to the circuitry 104 for implementing testing. The test apparatus 102 can also include a test measurement/analysis circuit (e.g., hardware and/or software) 108 configured to measure responses to the test stimuli (provided by test stimulus circuit 106) during testing. As one example, the test apparatus 102 is implemented as one of the automated test equipment products commercially available from Teradyne Inc. of North Reading, Massachusetts. Other example test apparatus are readily available commercially from other vendors.

In the example of FIG. 1, the circuitry 104 includes a pulse generator 110 having a control input 112 and a pulse output 114. The control input 112 is adapted to be coupled to one or more outputs of the test apparatus 102. The pulse generator 110 is configured to provide a monoshot (e.g., one-shot) pulse signal, shown as P1, at the pulse output 114 responsive to a test enable signal, shown as ENABLE, at the control input 112. The ENABLE signal can be provided as a signal representative of a forward event. In an example, the pulse generator 110 is configured to provide the pulse signal P1 having a duration. The duration of the pulse signal P1 at 114 can be fixed as a design parameter for the circuitry 104 or it can be configurable (e.g., set to a known value responsive to a test control parameter). A no-load delay (e.g., a forward delay) occurs between the ENABLE signal and the pulse signal P1. The no-load delay can result from time for the control loop and other circuitry in the test system 100 to initialize to expected operating parameters.

The circuitry 104 can also include a buffer 116 coupled between the pulse output 114 and a test output terminal 118 of the circuitry. The test output terminal 118 can be coupled directly to the buffer output or it can be coupled to the buffer output indirectly through an output network (e.g., a multiplexer) configured to selectively route a number of test signals to the output terminal 118. The buffer 116 is configured to provide a buffered output signal at the terminal 118 representative of the pulse signal P1 generated by the pulse generator 106. The buffer 116 electrically isolates the test output terminal 118 from the pulse output 114 and other circuitry (e.g., voltage supplies and/or loads) that is coupled to the pulse output. As a result, the test measurement/analysis circuit 108 of apparatus 102 can measure signals at 118 without affecting or being affected by the circuitry coupled to the pulse output 114.

In an example where the circuitry 104 is implemented as an IC die (e.g., on a wafer pre-singulation or a singulated die), the buffer 116 can be implemented as a multi-inverter chain buffer driven by an external voltage source (e.g., implemented in test apparatus 102 or hardware interface board) to reduce loading on internal voltage supplies of the IC die. The multi-inverter chain version of the buffer 116 thus can provide a buffered output signal representative of the pulse signal P1 to the terminal 118, such as implemented as a probe pad of an IC die implementing the circuitry 104. The test apparatus 102 is coupled to the probe pad by a probe or other coupling device. In other examples, different buffer configurations can be used, such as can vary depending on how the test apparatus is coupled to the terminal 118 and the configuration of the circuitry 104.

The circuitry 104 also includes a linear driver 120 having a driver output 122 and a voltage input 124. The voltage input 124 can be coupled to a voltage input terminal (e.g., a probe pad or pin) 126 of the circuitry 104, which is adapted to be coupled to an external voltage source. The voltage source (not shown) can be implemented in the test apparatus 102 or as part of a hardware interface board to which the circuitry 104 may be coupled. In some examples, test stimulus circuitry 106 provides a voltage potential across the terminals 112 and 126 representative of a forward event signal, which can be used to activate the linear driver 120 and pulse generator 110.

In the example of FIG. 1, a switch S1 is coupled between the driver output 122 and a drive output terminal 128 of the circuitry 104. The switch S1 has a control input coupled to the pulse output 114. The switch S1 is thus configured to couple the driver output 122 to the drive output terminal 128. A capacitive load, shown as C1, is coupled to the drive output terminal 128. In the example of FIG. 1, the capacitive load C1 is a capacitor coupled between the drive output terminal 128 and ground. As described herein, the capacitor C1 can be implemented external to the circuitry 104, such as implemented on the hardware interface board or within the test apparatus 102. The capacitor C1 has a known capacitance and, when coupled at the output terminal 128, provides a linearly increasing voltage, shown as VC1, responsive to the constant current I_CAP. Different capacitances will charge linearly at different rates responsive to the constant current I_CAP.

As a further example, the linear driver 120 is configured to linearize charging of the capacitive load (e.g., capacitor C1) coupled to the drive output terminal of the circuitry 104. In an example, the linear driver 120 is implemented as a constant current source configured to provide a constant current, shown as I_CAP, which is provided to the drive output terminal 128 responsive to the monoshot pulse signal P1. When the capacitor C1 is coupled to the drive output terminal 128, the voltage across the capacitor C1, shown as VC1, increases linearly responsive to the constant current I_CAP provided through the switch S1 (when closed responsive to the pulse signal P1).

As described herein, the test measurement/analysis circuit 108 of test apparatus 102 is coupled to output terminals 118 and 128 of the circuitry, and configured to measure respective signals and determine timing information based on the measured signals. For example, the test measurement/analysis circuit 108 is configured to measure the no-load delay for the circuitry 104 responsive to the ENABLE signal (e.g., representative of an internal forward delay event) with no capacitive load coupled at the drive output terminal 128. In an example, the measurement/analysis circuit 108 determines the no-load forward delay as a difference between a time when the forward event occurs (e.g., the start of the ENABLE signal) and a start time for the pulse signal P1. In another example, the measurement/analysis circuit 108 determines the no-load forward delay as a difference between the time when the forward event occurred and a time when voltage at 128 reaches a threshold voltage with no capacitive load coupled at 128 responsive to the drive signal (e.g., current I_CAP).

The test measurement/analysis circuit 108 is also configured to measure a load forward delay (also referred to herein as a capacitive charge delay) for the circuitry 104 representative of a capacitive charge delay for the circuitry 104 responsive to the ENABLE signal (e.g., representative of a forward event) with the capacitive load C1 coupled to the terminal 128. For example, the measurement/analysis circuit 108 determines the capacitive charge delay as a difference between a time when the forward event occurs (e.g., the start of the ENABLE signal) and a time when voltage VC1 at 128 reaches a threshold voltage with the capacitive load C1 coupled at 128. The threshold value can be a fixed or configurable test parameter. For example, the threshold is set to a voltage value representative of a turn-on or gate-to-source (VGS) threshold voltage of a field effect transistor (FET), which is adapted to be coupled to terminals 112, 126 and 128 of the circuitry 104. Similarly, the capacitor C1 can have a capacitance that equals (or approximates) the gate-to-source capacitance of the expected FET. In other examples, different respective thresholds and capacitance values can be used.

As described herein, the linear driver 120 is configured to provide the drive signal through S1 to cause voltage VC1 across the capacitor C1 to increase linearly during capacitive charging responsive to the drive signal (e.g., constant current I_CAP supplied by the linear driver 120). The test measurement/analysis circuit 108 thus records the time of the forward event (e.g., the start of the enable signal) and records the time when the voltage VC1 reaches (or crosses) the threshold voltage. The measured capacitive charge delay for C1 is the difference between the forward event time and the threshold-crossing time. The measured capacitive charge delay can be recorded and documented as part of the specification for the circuitry 104 (e.g., in an IC data sheet), such as to describe a total turn-on delay for a transistor having a gate-source capacitance equal to C1.

The test measurement/analysis circuit 108 can further measure a capacitance charge time for C1 responsive to the voltage VC1 at 128 reaching the threshold. The capacitive charge time is representative of a linear charging time for C1 responsive to the constant current I_CAP without including the preceding no-load delay time of the circuitry 104. In an example, the test measurement/analysis circuit 108 is configured to determine the capacitive charge time as a difference between the capacitive charge delay for C1 and the no-load delay. In another example, the test measurement/analysis circuit 108 is configured to measure the capacitive charge time from the start of the pulse P1 (e.g., measured at 118) to when the voltage VC1 to reach the threshold voltage.

The test measurement/analysis circuit 108 is also configured to determine a charge time delay for one or more other capacitance values (referred to herein as capacitance C2). The capacitance of C2 is different from the capacitance of C1 (C2≠C1). In one example, C1=10 nF and C2=30 nF. Different values of capacitances C1 and/or C2 can be used in other examples. Because the capacitance of C1 is known, the charging time delay for capacitance C2 can be calculated (e.g., extrapolated) from the charge time for C1 determined by the test measurement/analysis circuit 108 and the no-load delay time. For example, the test measurement/analysis circuit 108 is configured to calculate the charge delay time for capacitance C2 as a function of the capacitance charge time for C1 and the no-load delay time determined for a no-load condition (see, e.g., Eqs. 2 and 3).

The test measurement/analysis circuit 108 can also validate the charge delay time for capacitance C2 based on the duration (or pulse width) of the monoshot pulse signal P1. For example, the test measurement/analysis circuit 108 is configured to measure the duration of P1 by recording the start and end times of the buffered pulse P1 at 118. The test measurement/analysis circuit 108 can validate the charge delay time for capacitance C2 by confirming that the pulse duration is greater than the charging time of the capacitor C1 for which delay is being measured.

Figure 2:
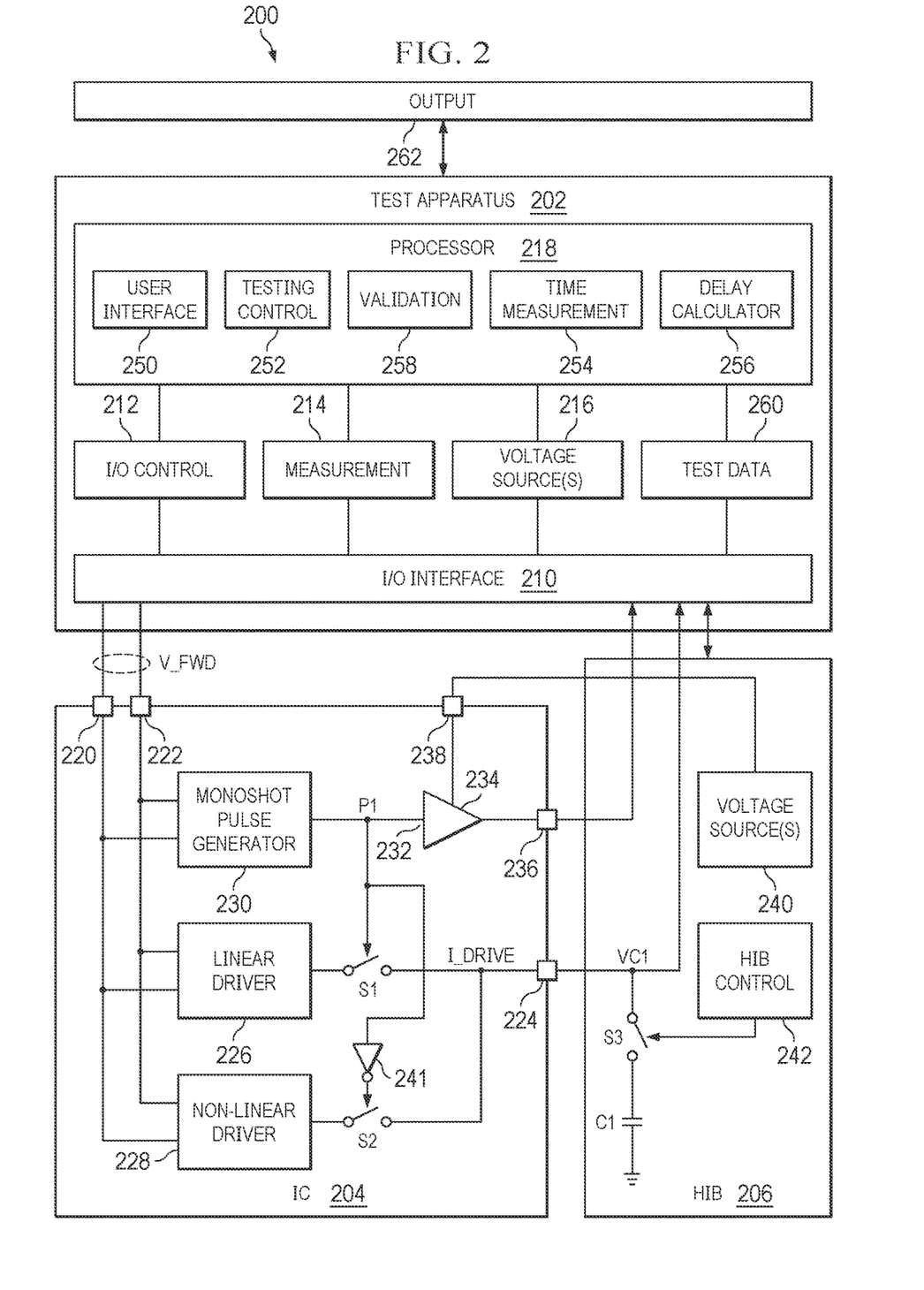
FIG. 2 depicts another example of a testing system including a test apparatus and an integrated circuit.

FIG. 2 depicts another example of a test system 200 including a test apparatus 202 and an IC 204 (a DUT). In the example of FIG. 2, the system 200 also includes a hardware interface board (HIB) 206 coupled between the test apparatus 202 and the IC 204. Any number of one or more instances of the IC 204 can be tested at a given time by the test apparatus 202 depending on the capabilities and configuration of the test apparatus and the HIB 206. The IC 204 being tested can be an IC chip (e.g., a pre-package or packaged die) or an SOC. The IC 204 depicts an example of an IC that can be implemented for the circuitry 104 of FIG. 1.

In the example of FIG. 2, test apparatus 202 includes an input/output (I/O) interface 210 having I/O terminals adapted to be coupled to respective terminals of one or more ICs under test. For example, the I/O interface is implemented as a switching network configured to route signals to and from the test apparatus based on control signals from an I/O control circuit 212. The test apparatus 202 can also include measurement circuitry 214 configured to measure signals (e.g., voltage signals) from the IC 204 under test. The measurement circuit can also measure various other signal characteristics (e.g., amplitude, frequency, etc.) according to testing requirements. The test apparatus 202 can also include one or more voltage source(s) 216 configured to supply voltage and/or current signals (e.g., stimulus signals) to the IC 204 during testing.

In the example of FIG. 2, the test apparatus 202 also includes a computing apparatus having a processor 218 configured to execute instructions (e.g., stored in non-transitory memory) programmed to perform respective functions associated with performing functional and/or structural testing of the IC 204. In the following example of FIG. 2, the processor 218 includes instructions programmed to control testing and determine respective time delays for the IC 204.

The IC 204 includes input terminals 220 and 222 coupled to respective outputs of the test apparatus 202. For example, the test apparatus is configured to provide a forward test voltage signal (V_FWD) across the respective terminals 220 and 222, such as an enable signal to initiate and control testing of the IC 204. In an example where the IC 204 is implemented as a control circuit for a transistor (e.g., a FET to be emulate an ideal diode), the terminals 220 and 222 can be anode and cathode terminals adapted to be coupled respectively to the source and drain of the FET. The IC 204 also includes another terminal 224 (e.g., a drive output terminal), which is adapted to be coupled to a gate of the FET. In the example of FIG. 2, the IC 204 includes drive circuitry, shown a linear driver 226 and a non-linear driver 228, configured to provide drive signals to the output terminal 224, such for controlling turn on or turn off the FET. The linear driver can also be part of the DFT circuitry implemented in the IC 204

The linear driver 226 has voltage inputs coupled to terminals 220 and 222. An output of the linear driver 226 is coupled to the terminal 224 through a switch S1. The non-linear driver 228 also has voltage inputs coupled to terminals 220 and 222. An output of the non-linear driver 228 is coupled to the terminal 224 through another switch S2. In an example, the non-linear driver is implemented as an analog amplifier configured to supply a drive signal to the terminal responsive to the voltage across terminals 220 and 222. The IC 204 thus is configured to implement linear and non-linear drive control for FET or other circuitry to which the IC is coupled.

In the example of FIG. 2, the IC 204 includes design for testing (DFT) circuitry configured to facilitate performing testing and validation functions on the IC 204. As described herein, the DFT circuitry includes a monoshot pulse generator 230 having inputs coupled to terminals 220 and 222. The monoshot pulse generator 230 is configured to provide a monoshot pulse signal P1 at a pulse output 232 responsive to the V_FWD (e.g., an enable signal) received at terminals 220 and 222 from the test apparatus 202. The DFT circuitry can also include a buffer 234 having an input coupled to the pulse output 232 and a buffer output coupled to a test output terminal 236. The buffer 234 thus is configured to provide a buffered output signal representative of the pulse signal P1 at the output terminal 236. For example, the measurement circuitry 214 of the test apparatus 202 is configured to measure the signal (e.g., voltage or current) at the terminal 236 of the IC 204.

The buffer 234 can be implemented as a multi-inverter or other buffer configuration that can isolate the buffer operation and output from affecting the internal circuitry of the IC 204. For example, the buffer 234 has a voltage input (e.g., voltage rail) coupled to input voltage terminal 238, which is adapted to be coupled to an external voltage source 240. In the example of FIG. 2, the voltage source 240 is implemented in the HIB 206. In other examples, the voltage source 240 could be implemented in the test apparatus 202 (e.g., voltage source 216) or another location.

The output 232 of the monoshot pulse generator 230 is coupled to a control input of S1, and an inverter 241 is coupled between the output 232 and a control input of S2. The monoshot pulse generator 230 is thus configured to provide the pulse signal P1 to control respective switches S1 and S2 in a mutually exclusive manner. When the switch S1 is closed (and S2 is open) responsive to the pulse signal P1, the linear driver 226 provides a linear drive signal at 224. In contrast, when the switch S2 is closed (and S1 is open) responsive to an inverted version of the pulse signal P1, the output of the non-linear driver 228 is coupled to 224 to provide a non-linear drive signal.

In FIG. 2, the HIB 206 includes a capacitive load C1 coupled to the terminal 224 of the IC 204. In some examples, a switch S3 is coupled between the terminal 224 and C1. The HIB includes an HIB control circuit 242 having an output coupled to the control input of S3. The HIB control 242 is configured to control the switch S3 so the capacitive load is either coupled to the terminal 224 or no load is coupled to the terminal. The HIB control 242 can control S3 responsive to a command from the test apparatus and/or based on detecting a testing mode of the IC 204. The terminal 224 can also be coupled to a measurement input of the test apparatus 202 such as through an electrical connection of the HIB 206. For example, the measurement circuitry 214 of the test apparatus is configured to measure the voltage at the terminal 224 of the IC 204.

As described herein, the processor 218 of test apparatus 202 is configured to perform and control testing of the IC 204, including performing measurements and analyzing test results. For example, the processor 218 includes a user interface (UI) 250 configured to control and set testing parameters and/or initiate automated testing, such as responsive to a user input through an input device (e.g., keyboard, mouse, touchscreen or other device). A testing control function 252 is configured to apply testing parameters, synchronize testing functions, capture measurements and control other testing features for a given test.

As a further example, the testing control 252 is configured to control testing processes to measure and analyze a number of delays for different operating conditions of the IC 204. For an example of measuring a no-load delay (no-load forward delay) for the IC 204, the testing control 252 activates the voltage source 216 to apply the V_FWD signal to input terminals 220 and 222 representative of a forward event for the IC 204. The monoshot pulse generator 230 provides the pulse signal P1 responsive to V_FWD at input terminals 220 and 222, which closes switch S1 to couple the linear driver output to the terminal 224. The HIB control 242 also opens the switch S3 to provide the no-load condition by disconnecting C1 from the terminal 224. The measurement circuitry 214 measures the voltage at 224 (e.g., through the I/O interface) during the monoshot pulse. During such testing, a time measurement function 254 (e.g., instructions executed by processor 218) records a time (t1) at which the forward event occurs. The time measurement function 254 also records a time (t2) at which the voltage at 224 reaches a threshold. Because no capacitive load C1 is coupled at 224, the voltage at 224 reaches the threshold at the same (or approximately the same) time when the switch closes responsive to the pulse signal P1. A delay calculator 256 is configured to compute difference between times t2 and t1 during the no-load delay and provide a value (tdelay_0) representative of the no-load forward delay time for the IC 204 under test. The no-load delay value tdelay_0 for the IC 204 can be stored in test data (e.g., in non-transitory memory) 260 and/or be provided as an output 262.

For the example of measuring a capacitive charge delay (load forward charge delay) for the IC 204, the testing control 252 activates the voltage source 216 to apply the V_FWD signal to input terminals 220 and 222 representative of a forward event for the IC 204. During the capacitive charge delay measurement phase, the HIB control 242 controls the switch S3 to couple C1 to the terminal 224. The monoshot pulse generator 230 also provides the pulse signal P1 responsive to the V_FWD signal at input terminals 220 and 222, which closes switch S1 to couple the linear driver output to the terminal 224. Additionally, during capacitive charge delay testing, the measurement circuitry 214 measures the voltage VC1 at 224 and the time measurement function 254 records time t1 at which the forward event occurs (e.g., when the V_FWD signal is supplied to terminals 220 and 222). The time measurement function 254 also records time t2 at which the voltage at 224 reaches the threshold. As described herein, the voltage VC1 at 224 increases linearly responsive to the DC current (I_DRIVE), which is provided by the linear driver 226, charging C1. The delay calculator 256 is configured to determine capacitive charge delay time for charging C1 as a difference between times t2 and t1 during the capacitive charge delay testing phase, and provide a value (tdelay_C1) representative of the forward load delay time for the IC 204 to charge C1. The capacitive charge delay value tdelay_C1 for the IC 204 can be stored in the test data 260 and/or be provided as an output 262.

The delay calculator 256 can also be programmed to compute a capacitive charge time value (tcharge_C1), which is representative of a linear charging time for C1 responsive to the drive signal from the linear driver 226 without the preceding no-load delay time of the IC 204. For example, the delay calculator 256 is configured to compute tcharge_C1 as a difference between the capacitive charge delay for C1 and the no-load delay, such as follows:

$$t\text{charge\_C1} = t\text{delay\_C1} - t\text{delay\_0} \qquad \text{Eq. 1}$$

The delay calculator 256 is also configured to determine a charge time delay for one or more other capacitance values C2. For example, the delay calculator 256 is configured to compute a value for the charge delay time for capacitance C2 (tdelay_C2) based on the internal circuit delay represented by tdelay_0 and as a function of a ratio of the capacitances C2 and C1 multiplied by tcharge_C1, such as follows:

$$\text{tdelay\_C2} = \text{tdelay\_0} + \frac{C2}{C1} \times \text{tcharge\_C1} \qquad \text{Eq. 2}$$

Internal circuit delay remains constant regardless of the capacitive load C1 coupled at 224. The charging delay for the IC 204 can be scaled based on the capacitive load coupled to the terminal 224. Stated differently, $$\text{tdelay\_C2} = \text{tdelay\_0} + \frac{C2}{C1} \times (\text{tdelay\_C1} - \text{tdelay\_0}) \qquad \text{Eq. 3}$$

A validation function 258 is programmed to validate the charge delay time tdelay_C2 determined for capacitance C2 based on the duration (or pulse width) of the monoshot pulse signal P1. For example, measurement circuitry 214 is configured to measure the buffered version of P1 at 236. The time measurement function 254 determines a duration of P1 (tm), such as by recording the start and end times of the buffered pulse P1, and the delay calculator 256 computes a difference between the recorded start and end time. The validation function 258 is programmed to validate the value of the charge delay time tdelay_C2 by confirming that the pulse duration tm is greater than a charging time of the arbitrary capacitor C2 for which delay is being estimated. For example, the validation function 258 is programmed to validate tdelay_C2 by confirming that:

$$tm > t\text{charge\_C2} = \frac{C2}{C1} \times t\text{charge\_C1} \qquad \text{Eq. 4}$$

Because the value of tcharge_C2 is determined based on linear charging of C1, the validation function 258 evaluates Eq. 4 to ensure that monoshot pulse P1 did not expire before the voltage at 224 reached the threshold. Accordingly, the pulse width tm can be implemented as a design condition (constraint) for the pulse generator 230 in the IC 204. For example, assuming the maximum delay is tmax, which represents a maximum expected capacitive load (Cmax=C2). The monoshot pulse P1 needs to be long enough (to keep current source connected) to get Cmax charged up to the threshold voltage before P1 expires (which disconnects the DC current source). For example, the pulse duration tm can be designed to ensure following condition:

$$tm > t\text{charge\_Cmax} \qquad \text{Eq. 4}$$

where: tcharge_Cmax is the estimated charge time for Cmax, such as determined by Eq. 3 where Cmax is substituted for C2.

Figure 3:
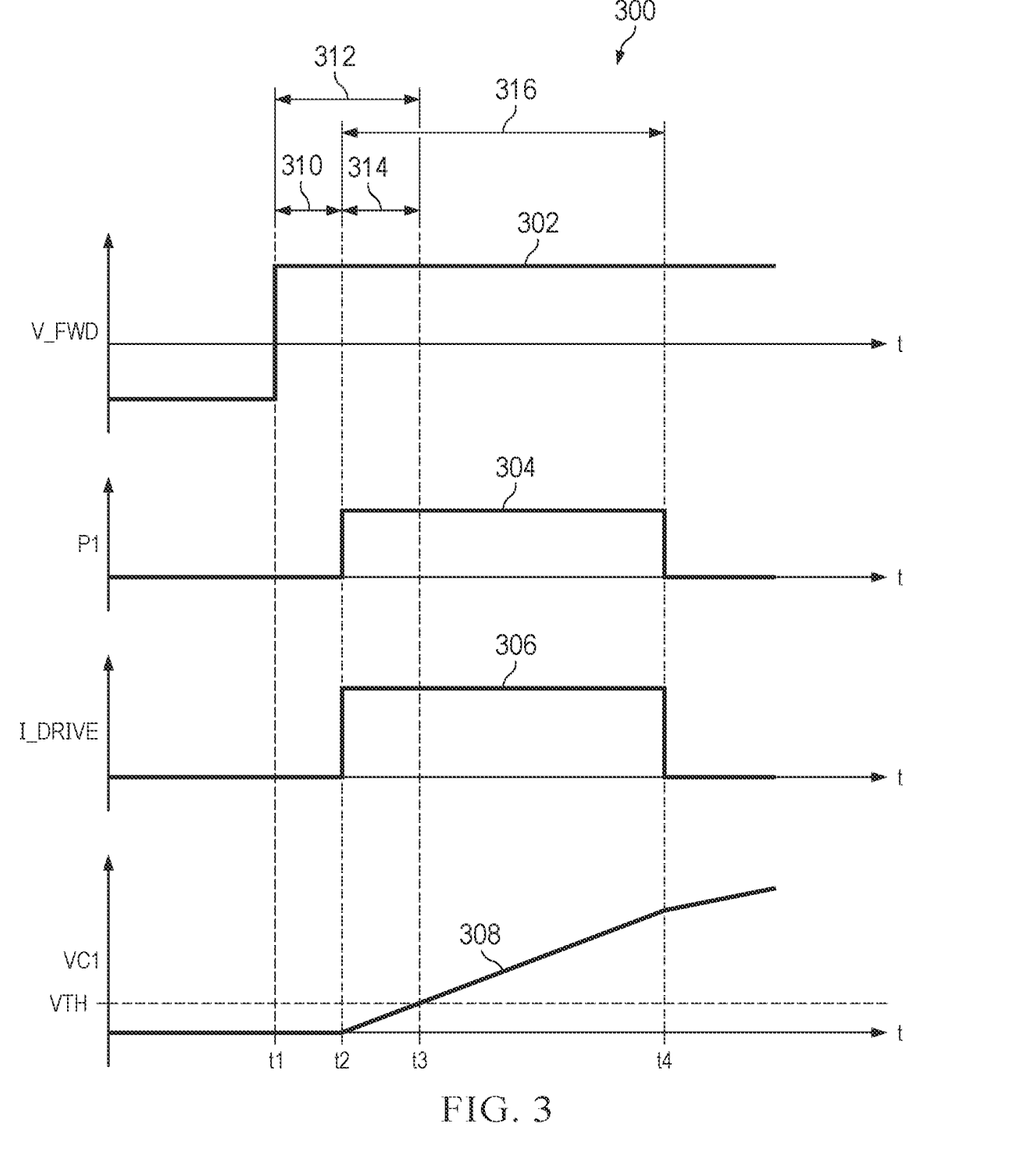
FIG. 3 is a timing diagram showing examples of signals in the integrated circuit of FIG. 1.

FIG. 3 is a timing diagram 300 showing examples of signals in the test system of FIG. 2. Accordingly, the description of FIG. 3 also refers to FIG. 2. The timing diagram 300 includes V_FWD, shown at 302, representative of the voltage across terminals 220 and 222. The start of the forward event, shown at t1, is aligned with the rising edge of forward voltage 302. As described herein, a pulse signal P1, shown at 304, is generated (e.g., by pulse generator 230) responsive to the start of the forward event at t1. A drive signal I_DRIVE, shown at 306, is generated (e.g., by linear driver 226) responsive to the pulse signal P1. For example, linear driver 226 provides I_DRIVE as a DC current. The start of the pulse signal P1 and the drive signal I_DRIVE begins at time t2. A difference between times t2 and t1 can be computed (e.g., by delay calculator 256) to determine a no-load delay forward time (e.g., tdelay_0), shown at 310. The voltage VC1 across the capacitor C1, shown at 308, begins to increase linearly responsive to the drive signal I_DRIVE (a DC current) beginning at time t2, and the voltage VC1 across the capacitor C1 crosses a threshold voltage VTH at time t3. A difference between times t3 and t1 can be computed (e.g., by time measurement and delay calculator functions 254 and 256) to determine a capacitive charge delay time (tdelay_C1), shown at 312. As described herein, delay calculator 256 can also compute a capacitive charge time tcharge_C1 as a difference between t3 and t2 (see, e.g., Eq. 1), shown at 314. The monoshot pulse signal P1 ends (e.g., goes low) at time t4, and thus has a duration tm shown at 316. The drive signal I_DRIVE also ends at t4, which also terminates the linear charging of C1. For example, switch S1 turns off and S2 can turn on to enable non-linear driver to provide a respective non-linear drive signal to output terminal 224.

Figure 4:
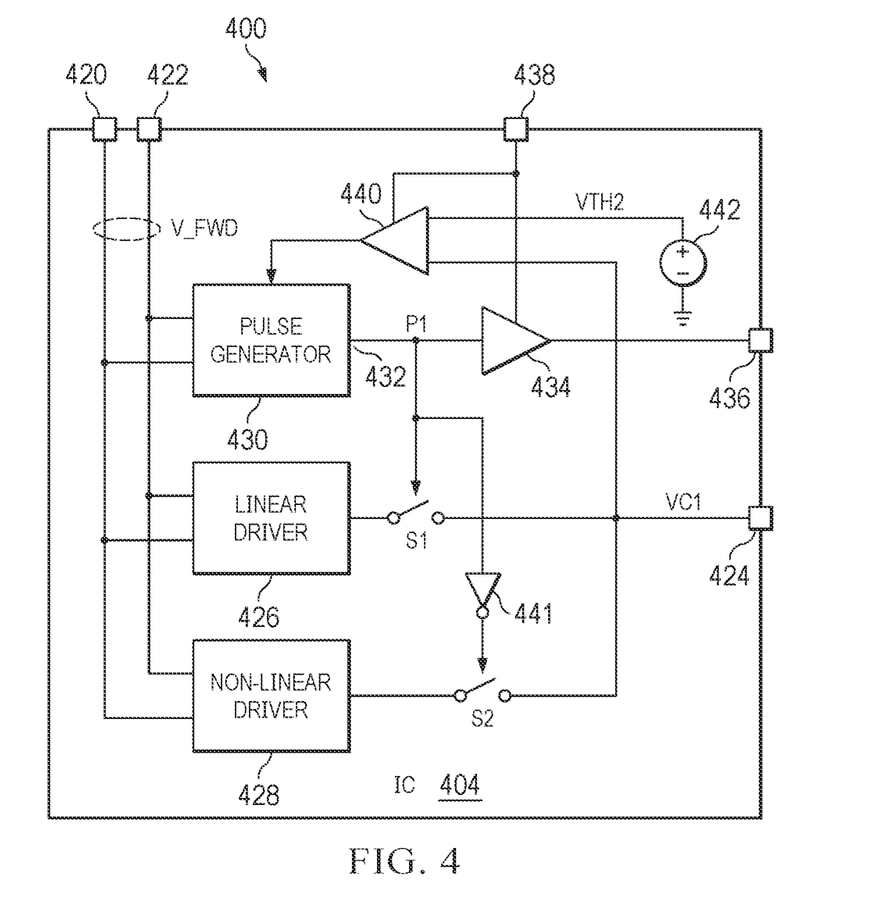
FIG. 4 depicts another example of an integrated circuit including design for testing circuitry.

FIG. 4 depicts another example of an IC 404 including design for testing circuitry. The IC 404 can be implemented for the IC 204 of FIG. 2 (or circuitry 104 of FIG. 1). The reference numbers in FIG. 4 have been increased by adding 200 to reference numbers described with respect to FIG. 2. The IC 404 includes input terminals 420 and 422 adapted to be coupled to respective outputs of the test apparatus. For example, the test apparatus can provide a forward event signal V_FWD across the respective terminals 420 and 422. The IC 404 also includes another terminal 424, which can be coupled to an external capacitor (C1) during testing.

The IC 404 includes a linear driver 426, a non-linear driver 428 and a monoshot pulse generator 430, such as described herein. Each of the linear driver 426, non-linear driver 428 and monoshot pulse generator 430 has respective inputs coupled to terminals 420 and 422. An output of the linear driver 426 is coupled to the terminal 424 through switch S1. An output of the non-linear driver 428 is coupled to the terminal 424 through another switch S2. The IC 404 thus is configured to implement linear and non-linear drive control for a FET or other circuitry coupled to the IC. The pulse generator 430 is configured to provide a pulse signal P1 at an output 432 responsive to the V_FWD (e.g., an enable signal) received at terminals 420 and 422, such as described herein. In an example, the pulse generator 430 is configured to provide pulse signal P1 as a monoshot pulse having a long duration or as logic signal that remains asserted until the voltage at 424 reaches a second voltage threshold. A buffer 434 is coupled between the output 432 and a test output terminal 436. The buffer 434 can be configured to provide a buffered output signal representative of the pulse signal P1 at 436. The buffer 434 can be implemented as a multi-inverter or other buffer configuration that can isolate the buffer operation and output from affecting the internal circuitry of the IC 404, such as described herein.

In the example of FIG. 4, the IC 404 also includes a comparator 440 having a first input coupled to terminal 424 and a second input coupled to voltage source 442. The voltage source 442 can be an internal voltage source of the IC 404 configured to provide second threshold voltage VTH2 to the second comparator input. For example, VTH2 is implemented as a design parameter of the IC, which is set to a value greater than the threshold voltage VTH used by the test apparatus (e.g., test apparatus 202) to determine the C1 charge delay (e.g., VTH2>VTH). The value of VTH used by the test apparatus can be a test measurement parameter set by the test apparatus (e.g., fixed or configurable in response to a user input). The comparator 440 is configured to provide a comparator output signal to the monoshot pulse generator 430 responsive to a comparison of the voltage VC1 at 424 and the threshold voltage VTH2. The comparator output signal can disable or reset the pulse generator responsive to the voltage at 424 exceeding the threshold voltage VTH2 (e.g., VC1>VTH2). The pulse generator 430 thus is configured to terminate the pulse P1 responsive to the comparator output signal having a value representative of the voltage at 424 exceeding the threshold voltage VTH2. In addition, or as alternative to disconnecting the linear driver 426 responsive to comparing the driver voltage to VTH2, the circuit 400 can be configured to disconnect the linear driver responsive to expiration of the monoshot pulse. As described herein, after (or concurrently with) the linear driver 426 being disconnected from the output 424, the non-linear driver 428 can be connected to the output 424 to perform other functions.

Figure 5:
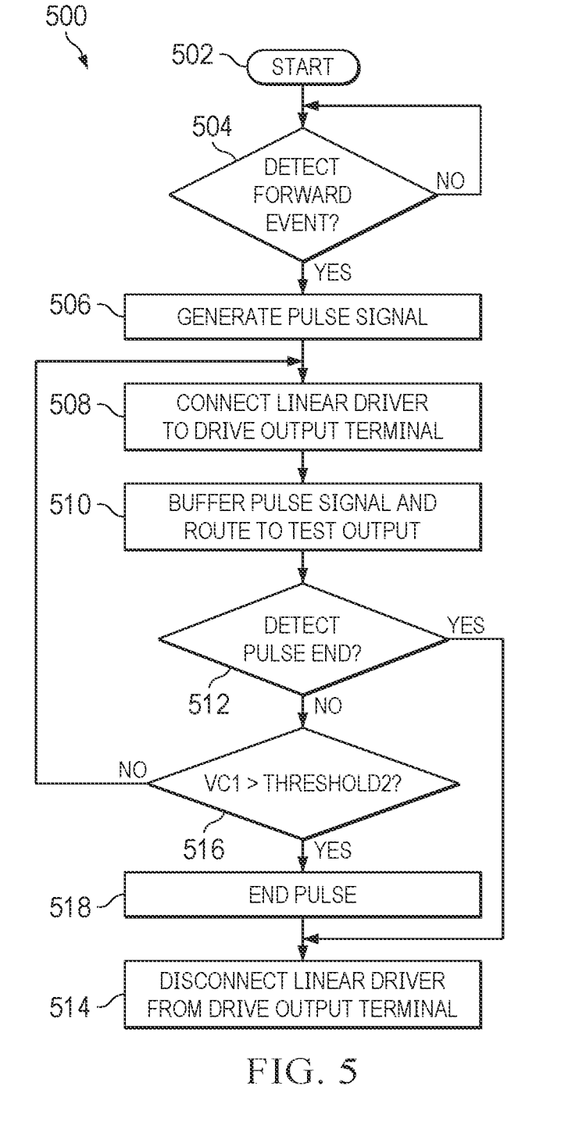
FIG. 5 is a flow diagram showing an example method for operating an integrated circuit during testing.
Figure 6:
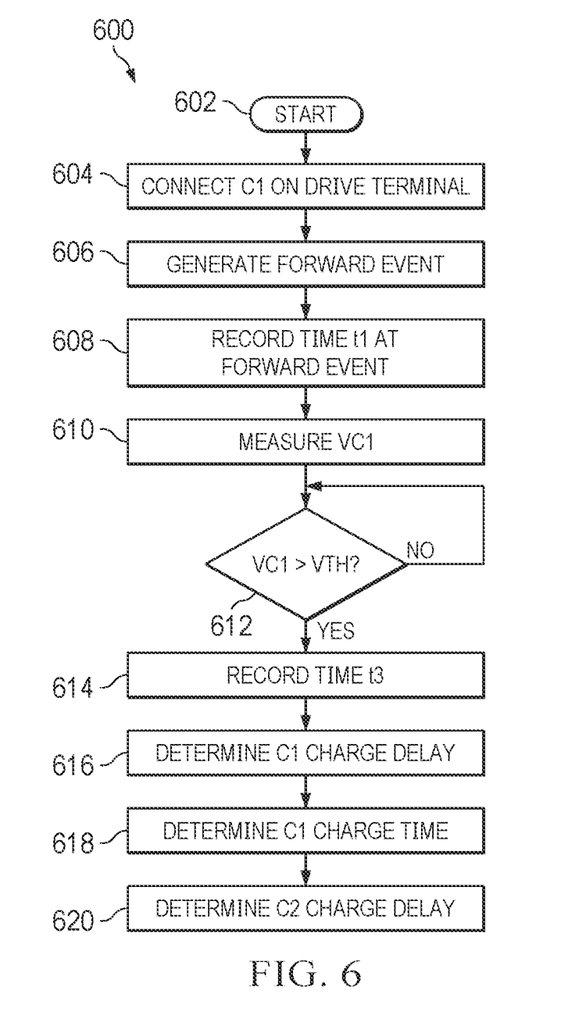
FIG. 6 is a flow diagram showing an example method for testing an integrated circuit.
Figure 7:
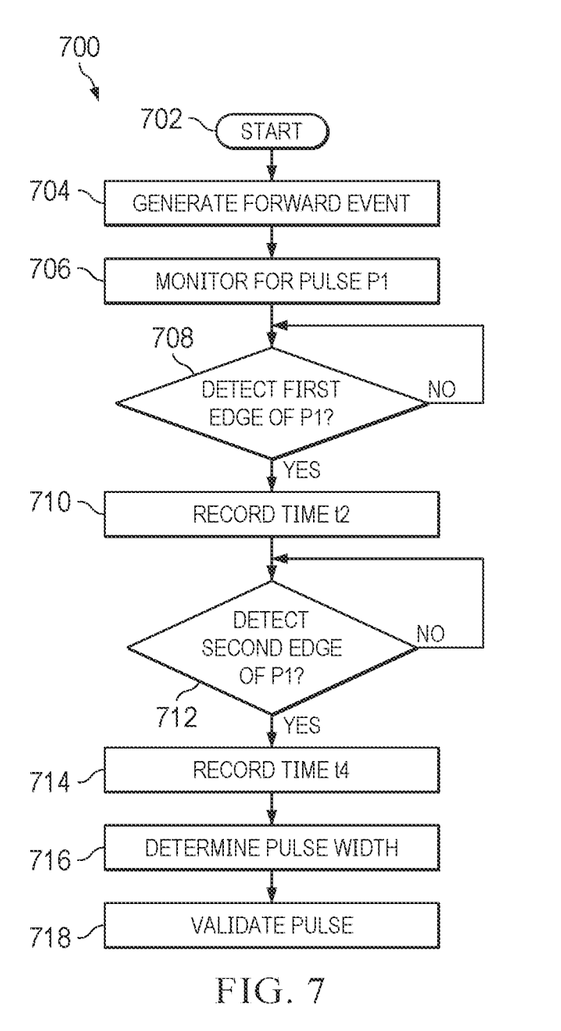
FIG. 7 is a flow diagram showing an example method for validating results of testing for an integrated circuit.

In view of the foregoing structural and functional features described above, example methods are described with respect to FIGS. 5, 6 and 7. While the methods of FIGS. 5, 6 and 7 are described as executing serially, systems and methods described herein are not limited by the illustrated order, as some parts could occur in different orders, multiple times and/or concurrently from that described herein.

FIG. 5 is a flow diagram showing an example of a method 500 for testing an IC, such as the IC 404. Accordingly, the description of FIG. 5 also refers to FIG. 4. The method 500 is also applicable to the circuitry 104 of FIG. 1 and the IC 204 of FIG. 2. The method starts at 502, such as responsive to power being applied to the IC 404 and electrical parameters being set to starting values. At 504, a determination is made as to whether a forward event has been detected. For example, the IC 404 includes one or more input terminals 420 and 422 configured to provide a forward voltage VFWD, which is representative of a forward event, to circuitry of the IC. If no forward event is detected by the IC, the methods 500 can loop at 504. In response to detecting a forward event, the method proceeds to 506 in which a pulse signal is generated. For example, pulse generator 430 is configured to generate a pulse responsive to the forward voltage VFWD.

At 508, the linear driver is coupled to the drive output terminal 424. For example, switch S1 is configured to connect the driver output of the linear driver 426 to the drive output terminal 424 responsive to the pulse signal (generated at 506). As described herein, the voltage VC1 at 424 increases linearly responsive to the drive signal (e.g., a DC current).

At 510, the pulse signal generated at 506 is also buffered and routed to a test output. For example, buffer 434 is configured to provide a buffer output signal representative of the pulse signal P1 provided at 414. The buffer output signal can be routed to the test output terminal 436 directly or through a test output stage (e.g., a multiplexer) configured to route one of a plurality of respective test signals to the terminal 436.

At 512, the method includes detecting whether the pulse has ended. If the end of the pulse is not detected (NO), the method proceeds back to 508 and maintain its current operating state during the testing method 500. The return to 508 can be directly or implement an addition detection function. For example, at 516, the method 500 determines if the voltage VC1 at 424 exceeds a threshold voltage VTH2. If the voltage VC1 at 424 does not exceed a threshold voltage VTH2, the method can return to 508 and maintain the connection between the linear driver and the drive output terminal as well as continue to buffer the pulse signal to the test output. At 512, if the end of the pulse is detected (e.g., due to the pulse terminating), the method proceeds to 514. Alternatively, responsive to determining at 516 that VC1>VTH2, the method proceeds to 518 to end the pulse. For example, comparator 440 can provide a control signal to reset or disable the pulse generator for terminating the pulse signal. From 518, the method could return to 512 to detect the end of the pulse signal or the method can proceed from 514 directly to 514, as shown. At 514, the linear driver is disconnected from the drive output terminal. For example, switch S1 can open responsive to the end of the pulse signal P1. In some examples, as described herein, S2 can be controlled to close responsive to the end of the pulse signal P1 to provide non-linear drive signal at 424.

FIG. 6 is a flow diagram showing an example of a method 600 for testing an IC. The method can be implemented by the system 200 of FIG. 1 for which FIG. 3 shows timing of respective signals. Accordingly, the description of FIG. 6 also refers to FIGS. 2 and 3. The method 600 begins at 602, such as by powering up voltage sources and measurement circuitry and initializing parameters to their starting values for testing. At 604, capacitor C1 is coupled to the drive terminal. Capacitor C1 can be external to the IC, such as implemented in the HIB 206 or the test apparatus 202. For example, the HIB 206 includes a switch S3 is coupled between C1 and the drive terminal 224, and HIB control 242 is configured to activate the switch S3 and couple C1 to the drive terminal 224 during the testing method 600. At 606, a forward event is generated. For example, the forward event includes applying a forward voltage to one or more input terminals 220 and 222 of the IC 204 to enable the testing method 600. At 608, time t1 is recorded to represent the start of the forward event.

At 610, a voltage across capacitor is measured. For example, measurement circuitry 214 is coupled to drive output terminal 224 through HIB 206 and is configured to measure VC1 responsive to a drive signal (e.g., provided by linear driver 226). As described herein, the IC 204 is configured to linearize the charge profile of C1, which is coupled to drive terminal 224 during the testing method 600. At 612, a determination is made as to whether VC1 exceeds a threshold. The threshold can be a threshold voltage set based on C1 having a capacitance that is equal to or approximates a known capacitance of a transistor (e.g., gate-to-source capacitance for a FET) or other load to be coupled to the drive output terminal 224. If the determination at 612 is negative (VC1 has not yet reached VTH), the method can loop at 612. In response to determining that VC1 has exceeded the threshold VTH, the method proceeds to 614. At 614, time t3 is recorded responsive to detecting VC1>VTH. Thus, t3 is representative of the time when VC1>VTH.

At 616, the capacitive charge delay for C1 is determined. For example, the capacitive charge delay 312 is determined as a difference between t3 and t1. At 618, the capacitive charge time for C1 is determined. The capacitive charge time can be determined as a difference between t3 and a no-load charge delay, such as described in Eq. 1. For example, the no-load charge delay can be determined as the difference between the start time t2 for the pulse P1, which is generated responsive to the forward event signal, and the recorded forward event time t1 (e.g., no-load charge delay=t2−t1). In another example, the no-load charge delay can be determined according to the method 600 of FIG. 6 but in the absence of connecting any load at 224. In the no-load test measurement, the no-load charge delay can be determined as a difference between t3 and t1 because the voltage at 224 will reach a high voltage upon application of the drive signal (e.g., at time t2 shown in FIG. 3).

At 620, the capacitive charge delay for C2 (e.g., tdelay_C2) is determined. The capacitive charge delay for C2 can determined as a function of the no-load charge time, the capacitive charge time for C1 (determined at 618) and a ratio of C1 and C2, such as described in Eqs. 2 or 3. Thus by performing the method 600, a variety of different capacitive charge delays can be determined for one or more capacitance values different from the capacitance C1 used during testing. This enables an expanded product specification to be provided for the IC at one or more other load capacitance values C2 without requiring testing with each such capacitance value.

FIG. 7 is a flow diagram showing an example of a testing method 700 for evaluating the duration of the pulse signal to confirm the second capacitance charge delay (e.g., tdelay_C2 determined for capacitance C2) is valid. The method 700 can be implemented by the system 200 of FIG. 2 for which FIG. 3 shows timing of respective signals. Accordingly, the description of FIG. 7 also refers to FIGS. 2 and 3. The method 700 begins at 702, such as by powering up voltage sources and measurement circuitry and initializing parameters to their starting values for testing. At 704, a forward event is generated. For example, the forward event includes applying a forward voltage to one or more input terminals 220 and 222 of the IC 204 to enable the testing method 700. At 706, the method includes monitoring for pulse P1 from the IC. For example, pulse generator 230 generates the pulse P1 responsive to the forward event, and a buffer is configured to provide a buffered version of the pulse P1 to a test output terminal (e.g., a pin or pad of the IC) 236, which is monitored by the test apparatus 202.

At 708, a determination is made as to whether a first edge of the pulse signal P1 is detected. For example, the first edge is a rising edge of the pulse signal P1. If no first edge of P1 is detected, the method can loop at 708. In response to detecting the first edge of P1, the method proceeds to 710 in which time t2 is recorded. As described herein, for example, time t2 is representative of the start of the pulse P1 that is generated for controlling charging of capacitor C1 coupled to the drive output terminal 224.

At 712, a determination is made as to whether a second edge of the pulse signal P1 is detected. For example, where the first edge is a rising edge of pulse signal P1, the second edge will be a falling edge. The method can loop at 712 until the second edge of P1 is detected. In response to detecting the second edge of P1, the method proceeds to 714 in which time t4 is recorded. At 716, a pulse width (e.g., duration, tm) of P1 is determined, such as based on a difference between t4 and t2 (e.g., tm=t4−t2). At 718, the pulse width tm is validated. For example, the validation 718 is implemented according to Eq. 4 to confirm that tm is larger than the charging time of capacitor C2 for which the charge delay is being determined by the method 600 of FIG. 6.

Experimental results and simulations have confirmed the validity of the measurements used for computing the charge delay for the second capacitance C2 (tdelay_C2) by the systems and methods described herein. For example, a difference between actual and calculated charge delay tdelay_C2 values determined for a 30 nF capacitance, where the tdelay_C2 values were computed using linear extrapolation based on measurements for a 10 nF capacitor coupled to the drive output terminal are shown below:

| | Calculated | | Actual/Measured | |
|---|---|---|---|---|
| | Mean | Sigma | Mean | Sigma |
| tdelay(30 nF) | 1204 ns | 38 ns | 1180 ns | 33.6 ns |

As shown in the table above, the difference between actual measured charge delay and calculated charge delay values was determined to be less than 50 ns, which demonstrates the efficacy of the circuits, systems and methods described herein.

In this description, the term "couple" or "couples" means either an indirect or direct connection. Thus, if a first device couples to a second device, that connection may be through a direct connection or through an indirect connection via other devices and connections. For example, if device A generates a signal to control device B to perform an action, then: (a) in a first example, device A is coupled to device B; or (b) in a second example, device A is coupled to device B through intervening component C if intervening component C does not alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A testing method comprising:
   connecting a capacitor having a first capacitance to an output terminal of an integrated circuit (IC);
   generating a pulse signal responsive to an enable signal provided at at least one input terminal of the IC;
   measuring a no-load delay representative of a time difference between a start of the enable signal and a start of the pulse signal;
   providing a drive signal to the output terminal to cause a linearly increasing voltage across the capacitor responsive to the pulse signal;
   measuring the linearly increasing voltage at the output terminal responsive to the drive signal;
   determining a first capacitance charge time for the capacitor responsive to the linearly increasing voltage reaching a threshold; and
   determining a second capacitance charge delay for a second capacitance based on the first capacitance charge time and the no-load delay.

2. The method of claim 1, wherein determining the first capacitance charge time comprises:
   measuring a first capacitance charge delay representative of a difference between the start of the enable signal and the voltage at the output terminal reaching the threshold; and
   determining the first capacitance charge time based on a difference between the first capacitance charge delay and the no-load delay.

3. The method of claim 2, wherein
   the second capacitance is different from the first capacitance, and
   determining the second capacitance charge delay comprises extrapolating the second capacitance charge delay as a function of the no-load delay and the first capacitance charge time.

4. The method of claim 3, wherein extrapolating the second capacitance charge delay is determined according to the following equation:

$C2\_delay = NL\_delay + (C2/C1) * C1\_charge$, wherein C2_delay is the second capacitance charge delay,
   NL_delay is the no-load delay,
   C2 is the second capacitance,
   C1 is the first capacitance, and
   C1_charge is the first capacitance charge time.

5. The method of claim 1, wherein the IC includes a buffer coupled between a pulse output of a pulse generator and a test output terminal of the IC, the pulse generator configured to generate the pulse signal, the method further comprising routing the pulse signal through the buffer to the test output terminal.

6. The method of claim 5, wherein the pulse signal is a monoshot pulse signal, the method further comprising:
   measuring the monoshot pulse signal at the test output terminal;
   determining a duration of the monoshot pulse signal; and
   evaluating the duration of the monoshot pulse signal to confirm the second capacitance charge delay is valid.

7. The method of claim 6, wherein the test output terminal is one of a pin of an IC package or a pad of an IC die.

8. The method of claim 1, wherein the drive signal is a DC current.

9. The method of claim 8, wherein providing the drive signal comprises connecting an output of a current source of the IC to the output terminal responsive to the pulse signal, the current source configured to provide constant current to the capacitor through the output terminal of the IC.

10. The method of claim 9, wherein the IC includes a switch is coupled between the output of the current source and the output terminal of the IC, and
    wherein providing the drive signal comprises activating the switch to couple the output of the current source to the output terminal responsive to the pulse signal.

11. The method of claim 1, wherein the IC includes a linear driver configured to provide the drive signal to linearize a charging profile of the capacitor and enable the second capacitance charge delay to be determined for the second capacitance.

12. The method of claim 1, wherein the IC is a controller configured to control an ideal diode circuit, the ideal diode circuit having an anode terminal, a cathode terminal and a diode control terminal, the anode terminal adapted to be coupled to an input of a transistor, the cathode terminal adapted to be coupled to output of the transistor and the diode control terminal adapted to be coupled to the output terminal of the IC.

13. A test system comprising:
an integrated circuit (IC) having an input terminal and an output terminal, the IC comprising:
a pulse generator having a control input and a pulse output, the control input coupled to the input terminal, the pulse generator configured to provide a pulse signal at the pulse output responsive to a forward event signal at the input terminal; and
a linear driver having a driver output, the linear driver configured to provide a drive signal at the driver output responsive to the pulse signal, the IC configured to couple the driver output to the output terminal responsive to the pulse signal;
a capacitor coupled to the output terminal, a linearly increasing voltage to be provided at the output terminal responsive to the drive signal; and
a test apparatus having a stimulus output and a measurement input, the stimulus output coupled to the input terminal, the measurement input coupled to the output terminal, the test apparatus configured to provide the forward event signal at the stimulus output, the test apparatus configured to measure the voltage at the output terminal.

14. The test system of claim 13, wherein the test apparatus is configured to:
provide the forward event signal at the stimulus output;
measure a no-load delay representative of a time difference between a start of the forward event signal and a start of the pulse signal;
measure the linearly increasing voltage at the output terminal responsive to the drive signal;
determine a first capacitance charge time for the capacitor responsive to the linearly increasing voltage reaching a threshold; and
determine a second capacitance charge delay for a second capacitance based on the first capacitance charge time and the no-load delay.

15. The method of claim 14, wherein the test apparatus is further configured to:
measure a first capacitance charge delay representative of a difference between the start of the forward event signal and the linearly increasing voltage reaching the threshold; and
determine the first capacitance charge time based on a difference between the first capacitance charge delay and the no-load delay.

16. The test system of claim 14, wherein
the output terminal of the IC is a drive output terminal, and
the IC further comprises a buffer coupled between the pulse output and a test output terminal, the buffer configured to provide a buffered version of the pulse signal to the test output terminal.

17. The test system of claim 16, wherein the measurement input of the test apparatus is a first measurement input, and the test apparatus has a second measurement input coupled to the test output terminal, the test apparatus is further configured to:
measure the pulse signal at the test output terminal;
determine a duration of the pulse signal; and
evaluate the duration of the pulse signal to confirm a validity of the second capacitance charge delay.

18. The test system of claim 13, wherein the IC further comprises a switch coupled between the driver output and the output terminal, the switch configured to couple the driver output to the output terminal responsive to the pulse signal.

19. The test system of claim 13, further comprising a hardware interface board coupled between the IC and the test apparatus, the hardware interface board including the capacitor.

20. An apparatus comprising:
a pulse generator having a control input and a pulse output, the pulse generator configured to provide a pulse signal at the pulse output responsive to a forward event signal at the control input;
a buffer coupled between the pulse output and a test output terminal;
a linear driver having a driver output, the linear driver configured to provide a drive signal at the driver output;
a switch coupled between the driver output and a drive output terminal, the switch configured to couple the driver output to the drive output terminal responsive to the pulse signal; and
a capacitor coupled to the drive output terminal, a linearly increasing voltage to be provided at the drive output terminal responsive to the drive signal.

21. An apparatus comprising:
a pulse generator having a control input and a pulse output, the pulse generator configured to provide a pulse signal at the pulse output responsive to a forward event signal at the control input;
a buffer coupled between the pulse output and a test output terminal;
a linear driver having a driver output, the linear driver configured to provide a drive signal at the driver output;
a switch coupled between the driver output and a drive output terminal, the switch configured to couple the driver output to the drive output terminal responsive to the pulse signal;
a capacitor coupled to the drive output terminal, a linearly increasing voltage to be provided at the drive output terminal responsive to the drive signal; and
wherein the linear driver comprises a current source configured to provide a DC current for charging the capacitor with a linear charging profile responsive to the pulse signal.

22. An apparatus comprising:
a pulse generator having a control input and a pulse output, the pulse generator configured to provide a pulse signal at the pulse output responsive to a forward event signal at the control input;
a buffer coupled between the pulse output and a test output terminal;
a linear driver having a driver output, the linear driver configured to provide a drive signal at the driver output;
a switch coupled between the driver output and a drive output terminal, the switch configured to couple the driver output to the drive output terminal responsive to the pulse signal;
a capacitor coupled to the drive output terminal, a linearly increasing voltage to be provided at the drive output terminal responsive to the drive signal; and
wherein the pulse generator, the buffer, the linear driver and the switch are implemented on a respective integrated circuit (IC) die, and the capacitor is external to the IC die.

23. The apparatus of claim 22, further comprising:
test stimulus circuitry configured to provide the forward event signal to at least one input terminal of the IC; and
test measurement and analysis circuitry configured to measure the linearly increasing voltage at the drive output terminal.

24. The apparatus of claim 23, wherein the test measurement and analysis circuitry is further configured to:
- measure a no-load delay representative of a time difference between a start of the forward event signal and a start of the pulse signal;
- determine a first capacitance charge time for the capacitor responsive to the linearly increasing voltage reaching a threshold; and
- determine a second capacitance charge delay for a second capacitance based on the first capacitance charge time and the no-load delay.

25. The apparatus of claim 24, wherein the test measurement and analysis circuitry is further configured to:
- measure a first capacitance charge delay representative of a difference between the start of the forward event signal and the linearly increasing voltage reaching the threshold; and
- determine the first capacitance charge time based on a difference between the first capacitance charge delay and the no-load delay.

26. An apparatus comprising:
- a pulse generator having a control input and a pulse output, the pulse generator configured to provide a pulse signal at the pulse output responsive to a forward event signal at the control input;
- a buffer coupled between the pulse output and a test output terminal;
- a linear driver having a driver output, the linear driver configured to provide a drive signal at the driver output;
- a switch coupled between the driver output and a drive output terminal, the switch configured to couple the driver output to the drive output terminal responsive to the pulse signal;
- a capacitor coupled to the drive output terminal, a linearly increasing voltage to be provided at the drive output terminal responsive to the drive signal; and
- wherein the apparatus is one of a pre-packaged semiconductor die, a packaged semiconductor die or a system on chip (SOC).

* * * * *